United States Patent Office 2,981,728
Patented Apr. 25, 1961

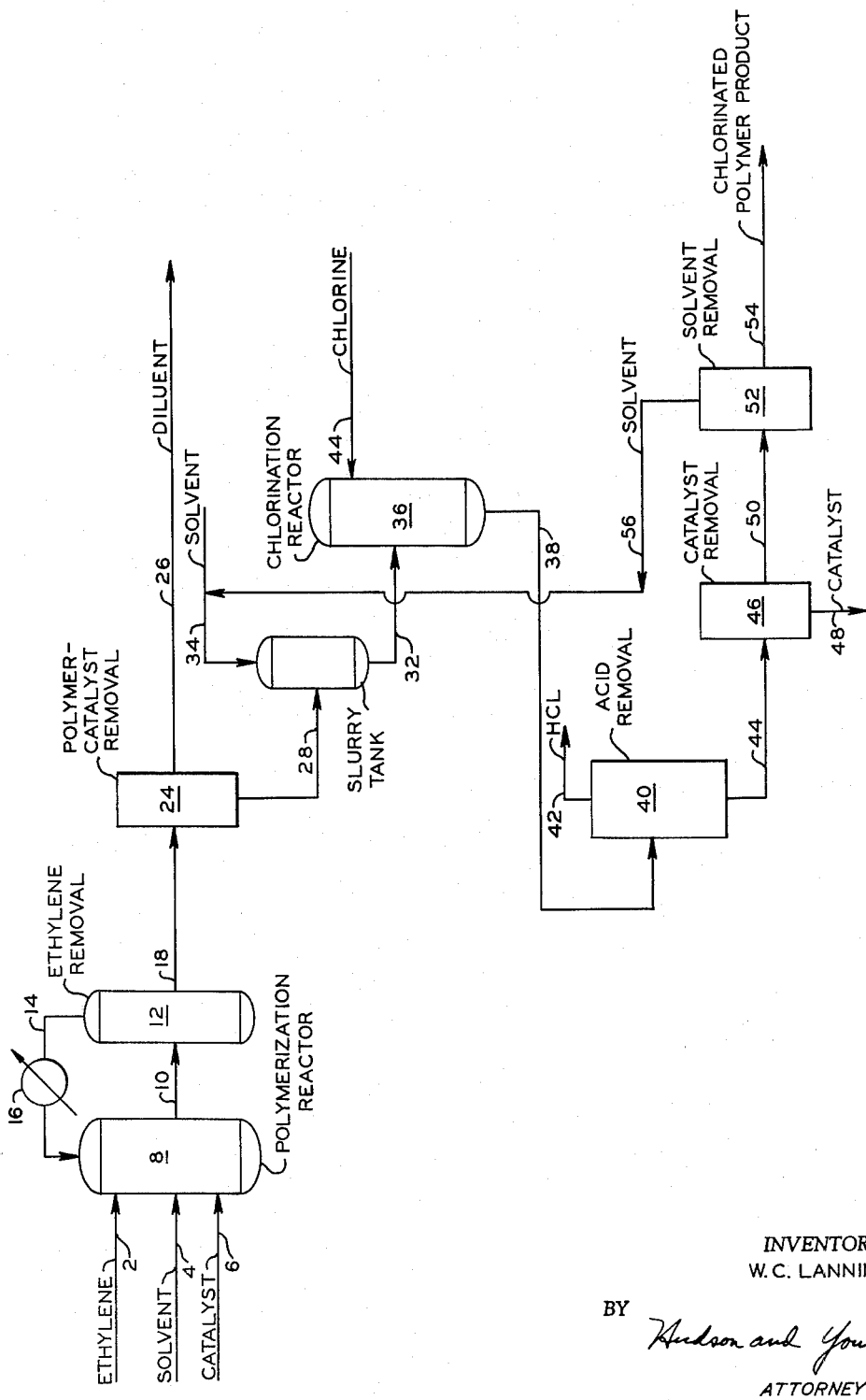

2,981,728

SEPARATION OF SOLID POLYMER FROM SOLID CATALYST BY HALOGENATION AND SOLUBILIZATION OF POLYMER

William C. Lanning, Bartlesville, Okla., assignor to Phillips Petroleum Company, a corporation of Delaware Filed Mar. 14, 1958, Ser. No. 721,569

9 Claims. (Cl. 260—94.9)

This invention relates to the conversion of olefin polymers of low solubility to soluble polymers. In one aspect it relates to the recovery of solid olefin associated with subdivided polymerization catalysts. In another aspect it relates to the halogenation of solid olefin polymers of low solubility associated with subdivided polymerization catalyst to provide a soluble polymer and recovery of said polymer from solution.

It is an object of this invention to provide a process for increasing the recovery of polymer product from the polymerization of olefins to solid polymers.

It is another object of this invention to provide an improved process for the halogenation of solid olefin polymers of low solubility.

Another object of this invention is to provide a process for converting solid olefin polymers of low solubility to soluble polymers.

Still another object of this invention is to provide an improved method for recovering catalyst and polymer from the polymerization of olefins to solid polymers.

Yet another object of the invention is to provide a method for converting solid olefin polymers of low solubility, associated with a subdivided polymerization catalyst, to soluble polymers.

These and other objects of the invention will become more readily apparent from the following detailed description and discussion.

The foregoing objects are achieved broadly by introducing a solid olefin polymer of low solubility into a liquid material in which said polymer is substantially insoluble at halogenation temperatures but in which the polymer is soluble when halogenated, halogenating said polymer to provide a material containing at least one halogen selected from the group consisting of chlorine and bromine and recovering halogenated polymer from the resulting solution.

In one aspect of the invention the polymer which is halogenated is associated with subdivided polymerization catalyst solids and comprises polymer which is normally insoluble in the polymerization reaction media.

In another aspect of the invention, when the polymer of low solubility is associated with catalyst solids, the halogenation is carried out in the presence of a liquid having a greater density than the polymer-catalyst solid composite and a lesser density than the catalyst solids per se. When sufficient polymer is halogenated and passes into solution so that the density of the polymer-catalyst composite particles exceeds the liquid density, these particles are carried from the reaction zone. The halogenated polymer, all of which becomes soluble at substantially the same degree of chlorination also passes from the reaction zone. Inasmuch as unreacted polymer is present in the reactor at all times (associated with the catalyst) and the residence time of the soluble chlorinated polymer in the reactor is limited, the soluble halogenated product leaving the reaction zone is substantially uniform in chlorine content.

This invention is applicable in general in the treatment of olefin polymers such as, for example, polymers or copolymers of monoolefins like ethylene, propylene, butylene, etc.; also, copolymers of monoolefins and diolefins such as butadiene, isoprene, etc. These polymers are prepared by contacting the olefin to be polymerized with a mobile catalyst in the presence of a solvent or diluent material at an elevated temperature and pressure. A number of catalytic materials can be used for the purpose of polymerizing olefins, the most desirable being chromium oxide, preferably containing hexavalent chromium, with silica, alumina, zirconia, thoria, silica-alumina, etc. These catalysts can be prepared, for example, by contacting soluble salts of chromium with silica, alumina, thoria, etc., for a sufficient period of time to impregnate the latter material. Following this, excess liquid is removed, for example, by filtering after which the solid catalyst is dried and activated at temperatures in the range of 450° F. to 1500° F. under non-reducing conditions for several hours. For a detailed discussion of the catalysts, their composition and their methods of preparation, reference can be had to the patent of Hogan and Banks, Patent No. 2,825,721, issued March 4, 1958, wherein the catalysts are discussed in detail. These and other solid catalysts or catalyst containing a solid component can be utilized in preparing the above polymers.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is maintained at a sufficient level to assure a liquid phase reaction, that is, at least about 100 to 300 p.s.i.g., depending upon the type of feed material and the polymerization temperature. Higher pressures up to 500 to 700 p.s.i.g. or higher can be used, if desired. The catalyst concentration in the reactor varies from about 0.01 and about 10 percent by weight. Generally, it is desirable to provide a reactant residence time of between about 15 minutes and about 12 hours.

The use of a diluent in the polymerization reaction in general serves two purposes. Since the reactions are usually exothermic in nature, the presence of a quantity of diluent provides a method for obtaining close control of the reaction temperature. In addition, as previously stated, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic hydrocarbons having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, preferably those having 5 to 12 carbon atoms, such as cyclohexane, methylcyclohexane, etc. Aromatic diluents can also be used; however, in some instances they (or impurities therein) tend to shorten the catalyst life, therefore, their use will depend on the importance of catalyst life. All of the foregoing and in addition, other hydrocarbon diluents which are relatively inert and in the liquid state at the reaction conditions may also be employed in carrying out the reaction of olefins to form solid polymers.

Although the invention is applicable to polymerization systems in general, it finds particular use in processes for the polymerization of 1-olefins having a maximum of 8 carbon atoms per molecule and no branching nearer the double bond than the 4-position; and more particularly in processes for the polymerization of ethylene under conditions which provide polymers of ethylene which have a density of at least 0.94 and preferably 0.96 or higher and a crystallinity of at least 70 percent and preferably at least 80 percent at normal atmospheric temperatures. While the polymerization of ethylene provides a preferred embodiment of the invention, it is not intended that the scope of the invention be limited thereby but that any of the other processes described are also within the invention.

One method of preparing polymers of olefins is described in detail in a patent of Hogan and Banks, Patent No. 2,825,721, issued March 4, 1958. This particular method utilizes a chromium oxide catalyst, preferably containing hexavalent chromium, with silica, alumina, silica-alumina, zirconia, thoria, etc. In the method of the Hogan et al. application, olefins are polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and under a pressure sufficient to maintain the reactant and diluent in the liquid state. The polymers produced by this method, particularly the polymer of ethylene, are characterized by having an unsaturation which is principally either trans-internal or terminal vinyl, depending on the particular process conditions employed. Polymers prepared by this method are also characterized by their high densities and high percentage of crystallinity at normal atmospheric temperatures.

The polymers which are produced in accordance with the foregoing discussion comprise both polymers which are soluble and polymers which are insoluble in the polymerization reaction diluent. By appropriately controlling the polymerization reaction temperature, generally below 230° F., it is possible to produce increased yields of polymer, which polymer is insoluble in the diluent and is produced in particle form. This polymer is formed in association with the polymerization catalyst and is non-tacky, non-agglutinative and suspended in the liquid diluent. A more detailed discussion of the preparation of insoluble particle form polymers is contained in the co-pending application of Leatherman et al., Serial No. 590,567, filed June 11, 1956. The following discussion is directed to a specific embodiment of the invention as relating to the halogenation of polymer associated with the polymerization catalyst. This is not intended however, in any limiting sense, and in its broad aspect the invention comprises generally converting olefin polymers of low solubility to soluble polymer by halogenation.

In carrying out the invention in one embodiment thereof an olefin polymer of low solubility, such as ethylene polymer, associated with a solid polymerization catalyst, such as chromium oxide catalyst containing hexavalent chromium, is mixed with a material in which said polymer is substantially insoluble at halogenation temperatures but in which the polymer is soluble when halogenated, and the polymer is halogenated to provide a product containing at least one halogen selected from the group consisting of chlorine and bromine whereby it passes into solution. Following halogenation, the catalyst and polymer solution are separated and the halogenated polymer is recovered from solution.

The halogenation reaction is usually carried out over temperatures ranging from about 60 to about 100° C. and preferably 70 to 90° C. The pressure is maintained at a sufficient level to prevent any vaporization of liquid from the reaction; however, if desired the reaction can be carried out under more elevated pressures. The halogenating agents or reactants employed are the elemental halogens, chlorine and bromine, or compounds which supply these elemental halogens under the disclosed reaction conditions. Halogenation can be carried out either in the presence or absence of a halogenation catalyst. Usually, it is preferred to employ a halogenation catalyst since the reaction appears to proceed more smoothly when catalyzed. Suitable catalysts for the reaction are peroxides and hydroperoxides, for example, benzoyl peroxide, diisopropyl-benzene hydroperoxide and cumene hydroperoxide; also azo compounds particularly those having cyano groups on carbon atoms alpha to the azo nitrogen atoms, such as dimethyl and diethyl alpha, alpha-azodiisobutyrate, alpha, alpha-azodiisobutyronitrile, and alpha, alpha-azobis(alpha, gamma-dimethylvaleronitrile). Alternatively the reaction can be promoted by sunlight or other radiation such as ultra violet light. In general any solvent in which the polymer is substantially insoluble before halogenation but soluble after halogenation and which is non-reactive and readily separable from the halogenated polymer can be used in carrying out the invention. Particularly suitable solvents include halogenated hydrocarbon solvents such as carbon tetrachloride, dichloroethane, tetrachloroethane, chloroform, methyl chloride, chlorobenzene, and the like. The polymer is substantially insoluble in these solvents at the halogenation reaction temperatures, namely temperatures up to about 100° C. The more preferred solvents are carbon tetrachloride and tetrachloroethane by reason of their inertness toward elemental halogen and their ease of recovery from the halogenated product. The quantity of solvent employed depends on a number of factors including the particular solvent used and the particular polymer and amount of said polymer to be halogenated. In general, it is desirable to provide sufficient solvent so that the solution formed, following halogenation of the polymer, contains between about 1 and about 5 percent polymer by weight.

The polymer can be halogenated to contain either chlorine or bromine or a mixture thereof. The halogenated polymer can contain from as low as 5 percent halogen to as high as 35 percent halogen, the amount being determined by the solubility desired in the resulting product.

In one aspect of the invention, which will be described in more detail in the discussion of the accompanying drawing, insoluble polymer having associated therewith polymerization catalyst, is chlorinated to provide a product having a substantially uniform chlorine content in a continuous process.

The halogenated polymers prepared in accordance with this invention are useful for the manufacture of adhesives, surface coatings, sheets, films and molded articles. They can be formed into tubes, or containers for liquids. They can be used as liners for metal tanks or constituents of protective coating compositions.

In order to more clearly describe the invention and provide a better understanding thereof, reference is had to the accompanying drawing which is a diagrammatic illustration of a polymerization unit and a halogenation unit suitable for carrying out the invention in a preferred embodiment thereof. Referring to the drawing, ethylene, normal pentane diluent and chromium oxide catalyst are introduced to reactor 8 through conduits 2, 4 and 6, respectively. For ease of handling the catalyst is slurried in normal pentane before it is introduced into the reactor. During polymerization the material in the reactor is maintained in a highly agitated state by means of a mechanical mixer or other conventional mixing means (not shown). The reaction is carried out at a temperature of about 225° F. and a pressure of 450 p.s.i.a. and for a sufficient period of time to convert a portion of the ethylene feed to particles of solid ethylene polymer. Reaction effluent leaves the reactor through conduit 10 and enters separation zone 12 from which a stream comprising principally unconverted ethylene and some diluent is separated and returned to the reactor through conduit 14 and cooler 16. Following this step, the effluent now comprising particles of solid polymer associated with subdivided catalyst slurried in normal pentane, is introduced to solids removal zone 24 through conduit 18. Removal of the polymer particles is effected by any suitable means such as by centrifugation, filtration and the like. In this specific instance removal of polymer-catalyst solids is effected by centrifugation, separated diluent being yielded through conduit 26. The polymer catalyst solids which leave removal zone 24 contain only a small amount of catalyst, usually in the range of 0.1% by weight or less. The polymer-catalyst solids are introduced to slurry tank 30 wherein the solids are slurried in carbon tetrachloride introduced through conduit 34. After the slurry is formed it is passed from the slurry tank through conduit 32 and introduced to chlorination reactor 36. The temperature in reactor 36 is maintained at a sufficient level to provide chlorination of the polymer but is below the temperature at which the unchlorinated polymer is soluble to any appreciable extent in the carbon tetrachloride. The chlorine required for the reaction is introduced to the reactor through conduit 44. In its normal state, that is, uncontaminated with polymer, the polymerization catalyst has a density which is substantially higher than the density of carbon tetrachloride. However when associated with the polymer, which is relatively low in density, the catalyst polymer mixture has a lower density than the solvent. As polymer is removed from the catalyst the density of the catalyst-polymer mixture increases until the catalyst becomes sufficiently heavy that it settles from the solvent. When this occurs the catalyst passes from the bottom of the primary reactor.

The polymer which is chlorinated becomes soluble and passes into solution. Since the factor which affects solubility is degree of chlorination all of the polymer entering solution has substantially the same chlorine content. Preferably the chlorine reacts with unchlorinated polymer, or polymer which is insufficiently chlorinated to be soluble therefore there is little tendency for the dissolved chlorinated polymer to become increased in chlorine content. The chlorine content of the soluble polymer can be controlled by varying the reaction temperature and by using various diluents, selected from those previously described. If desired additional chlorination of the polymer can be effected in a separate operation.

The effluent from the reactor comprising settled catalyst and solvent having dissolved therein chlorinated polymer of substantially uniform chlorine content is passed through conduit 38 to acid removed zone 40. In this zone hydrochloric acid formed in the chlorination reactions is removed and withdrawn from the unit through conduit 42. Any suitable method can be employed for removing the acid such as, for example, by neutralization with caustic followed by water-washing. The acid free effluent is passed from zone 40 through conduit 44 to catalyst removal zone 46 wherein separation of catalyst polymer solids from polymer solution is effected by filtration, centrifugation or similar means. The separated solids are removed through conduit 48 and the remaining polymer solution passes through conduit 50 to a solvent removal zone 52. In this zone the final separation is made between solvent and chlorinated polymer product, said polymer being yielded through conduit 54. Preferably the recovered solvent is reused in the process, being combined with the fresh solvent through conduit 56.

The preceding embodiment of the invention illustrates the invention in its broad aspect, namely, converting a polymer of low solubility to a soluble polymer and also provides a specific application of the invention wherein polymer is chlorinated to provide a soluble product having a substantially uniform chlorine content.

The following data are presented in illustration of an application of an embodiment of the invention.

*Example*

Ethylene was polymerized in the presence of a chromium oxide-silica-alumina catalyst containing 2.5 percent by weight of chromium and containing hexavalent chromium. Prior to the reaction the catalyst was activated in air by subjecting it to gradual increasing temperature up to 950° F. The operating conditions under which the polymer was formed were as follows:

Pressure _____ 250 p.s.i.g.
Temperature _____ 220° F.
Productivity _____ 908 (# polymer/# catalyst).

The polymer product had the following properties:

Ash _____ 0.11 wt. percent.
Inherent viscosity _____ 4.0
Density _____ 0.957 gm./cc.
Melting point _____ 280° F.
Impact strength, Izod [1] _____ 14.2 ft./lb./inch of notch.

[1] ASTM D256–47T

A sample of 50 gm. of the polyethylene product was suspended in two liters of tetrachloroethane in a 3-liter flask and the suspension was heated to 80° C. with stirring. Maintaining the temperature at 80° C., 100 gm. of chlorine was passed into the suspension while irradiating with ultraviolet light. The suspension was then filtered at 80° C. through a sintered glass funnel. The insoluble portion (part A) was washed with isopropyl alcohol. The soluble portion was recovered by pouring the filtrate into isopropyl alcohol and filtering the precipitate (part B). Both parts were dried in a vacuum oven at 50° C. for 16 hours.

|  | Part A | Part B |
| --- | --- | --- |
| Yield | 60.0 gm | 3.0 gm. |
| Percent Cl in polymer | 21.7 | 55.6. |
| Physical texture | white powder | dark friable resin. |

A sample of 75 gm. of the polyethylene product was suspended in 500 cc. of tetrachloroethane, the suspension was heated to 80° C. and then filtered. The filtrate was poured into one liter of isopropyl alcohol. The polymer was precipitated and dried in a vacuum oven at 50° C. for six hours. The weight of polymer recovered from the filtrate was 0.01 gm.

It is noted from the above data that the unchlorinated polymer had a solubility at 80° C. of only 0.02 gm. per liter of tetrachloroethane, whereas 1.5 gm. of the halogenated polymer was dissolved per liter at the same temperature.

Having thus described the invention by providing specific examples thereof, it is to be understood that no undue limitations or restrictions are to be drawn by reason thereof and that many variations and modifications are within the scope of the invention.

In the claims:

1. A process for the separation of solid, high density, highly crystalline polymers of 1-olefins having a maximum of 8 carbon atoms per molecule and no branching nearer the double bond than the 4-position from the intimately associated solid catalyst used to polymerize the monomer which comprises dispersing said polymer-catalyst solid in a halogenated hydrocarbon liquid in which said polymer and catalyst are substantially non-soluble in the temperature range used for halogenating said polymer but in which the halogenated product of said polymer is soluble in said temperature range, contacting said dispersion with a halogenating agent providing a halogen selected from the group consisting of bromine and chlorine at a pressure sufficient to maintain said liquid substantially in liquid phase, separating the resulting halogenated polymer solution from the catalyst solids and recovering halogenated polymer product.

2. The process of claim 1 wherein said polymer is polyethylene having a density of 0.940 to 0.990 and said catalyst is chromium oxide containing hexavalent chromium associated with an oxide selected from the group consisting of silica, alumina, zirconia and thoria.

3. The process of claim 2 wherein said halogenated hydrocarbon liquid is carbon tetrachloride.

4. The process of claim 2 wherein said halogenated hydrocarbon liquid is tetrachloroethane.

5. A process for the separation of solid, high density, highly crystalline polymers of ethylene having a maximum of 8 carbon atoms per molecule and no branching nearer the double bond than the 4-position from a solid chromium oxide catalyst containing hexavalent chromium associated with an oxide selected from the group consisting of silica, alumina, zirconia and thoria which comprises dispersing said polymer-catalyst solid in a halogenated hydrocarbon liquid in which said polymer and catalyst are substantially non-soluble in the temperature range of 60 to 100° C. but in which the chlorinated product of said polymer is soluble in said temperature range, contacting said dispersion with chlorine at a pressure sufficient to maintain said liquid substantially in liquid phase at a temperature of 60 to 100° C., separating the resulting chlorinated polyethylene solution from the catalyst solids and recovering said chlorinated polyethylene product.

6. The process of claim 5 wherein said halogenated hydrocarbon liquid is carbon tetrachloride.

7. The process of claim 5 wherein said halogenated hydrocarbon liquid is tetrachloroethane.

8. A process for the separation of solid, high density, highly crystalline polymers of 1-olefins having a maximum of 8 carbon atoms per molecule and no branching nearer the double bond than the 4-position from the intimately associated solid catalyst used to polymerize the monomer which comprises dispersing said polymer-catalyst mixture in a halogenated hydrocarbon liquid in which said polymer and catalyst are substantially non-soluble in the temperature range used for halogenating said polymer but in which the halogenated product of said polymer is soluble in said temperature range, said liquid having a density greater than the polymer-catalyst solids but less than the catalyst solids; contacting said dispersion with a halogenating agent providing a halogen selected from the group consisting of bromine and chlorine at a pressure sufficient to maintain said liquid substantially in liquid phase; separating the resulting halogenated polymer solution from the catalyst solids and recovering halogenated polymer product.

9. The process of claim 8 wherein said polymer is polyethylene having a density of 0.940 to 0.990 and said catalyst is chromium oxide containing hexavalent chromium associated with an oxide selected from the group consisting of silica, alumina, zirconia and thoria.

References Cited in the file of this patent
UNITED STATES PATENTS

| | | |
|---|---|---|
| 2,398,803 | Myles et al. | Apr. 23, 1946 |
| 2,405,971 | McAlevy | Aug. 20, 1946 |
| 2,422,919 | Myles et al. | June 24, 1947 |
| 2,481,188 | Babyan | Sept. 6, 1949 |
| 2,726,231 | Field et al. | Dec. 6, 1955 |